July 12, 1960

C. B. PARKER ET AL 2,944,855

VEHICLE BRAKE SYSTEM

Filed June 5, 1957

INVENTORS
CHARLES B. PARKER AND
PERSIS D. HOUSTON SR., DECEASED,
BY FIRST AMERICAN NATIONAL BANK,
AND PERSIS D. HOUSTON JR., CO-EXECUTORS.

BY Harrington A. Lackey
ATTORNEY

July 12, 1960  C. B. PARKER ET AL  2,944,855
VEHICLE BRAKE SYSTEM

Filed June 5, 1957  8 Sheets-Sheet 2

INVENTORS
CHARLES B. PARKER AND
PERSIS D. HOUSTON SR. DECEASED,
BY FIRST AMERICAN NATIONAL BANK,
AND PERSIS D. HOUSTON JR. CO-EXECUTORS.
By Harrington A. Lackey
ATTORNEY

INVENTORS
CHARLES B. PARKER AND
PERSIS D. HOUSTON SR. DECEASED,
BY FIRST AMERICAN NATIONAL BANK,
AND PERSIS D. HOUSTON JR., CO-EXECUTORS.
BY Harrington A. Lackey
ATTORNEY July 12, 1960 C. B. PARKER ET AL 2,944,855
VEHICLE BRAKE SYSTEM
Filed June 5, 1957 8 Sheets-Sheet 8

INVENTORS
CHARLES B. PARKER AND
PERSIS D. HOUSTON SR. DECEASED,
BY FIRST AMERICAN NATIONAL BANK,
AND PERSIS D. HOUSTON JR., CO-EXECUTORS.
BY Harrington A. Lackey
ATTORNEY

United States Patent Office

2,944,855
Patented July 12, 1960

2,944,855
VEHICLE BRAKE SYSTEM

Charles B. Parker, Nashville, Tenn., and Persis D. Houston, Sr., deceased, late of Nashville, Tenn., by First American National Bank of Nashville and P. D. Houston, Jr., co-executors, both of Nashville, Tenn.

Filed June 5, 1957, Ser. No. 663,854

18 Claims. (Cl. 303—8)

This invention relates to a vehicle brake system and more particularly to a fluid pressure system in which vehicle brakes are controlled by a combination of safety means.

Heretofore vehicle brake systems and particularly those employed in tractor-trailer vehicles have been of the straight air brake type. The application of the brakes in the trailer has been entirely dependent upon the ability of the vehicle brake system to supply compressed air from the tractor storage tanks through fluid lines to the brake mechanisms in the trailer. Such a vehicle brake system is highly vulnerable to defects of various kinds as evidenced by the numerous "runaway" trucks and highway accidents in which trucks and trailers have been involved. Such vehicle brake systems become inoperative when any portion of the fluid conduit becomes clogged, uncoupled or bursts. Also the brake system will become inoperative in the event of an operational failure in the compressor or brake controls, or a leakage in the storage tanks.

It is therefore an object of this invention to overcome the disadvantages enumerated and to provide a vehicle brake system having a combination of safety features and being particularly adapted for articulated vehicles such as tractor-trailer vehicles or railroad trains.

One object of this invention is to provide a novel vehicle brake system in which conventional parts of railroad brake devices may be employed.

Another object of this invention is to provide a vehicle brake system in which a plurality of fluid pressure conduits are employed, any one of which may be used to control the vehicle brakes at any time.

Another object of this invention is to provide a vehicle brake system combining a main air line, an auxiliary combination air line, and a straight air brake line.

A further object of this invention is to provide a vehicle brake system employing means for automatically setting the brakes in the event certain fluid conduits in the system should burst.

Another object of this invention is to provide a vehicle brake system employing a plurality of fluid lines in which manual control means are provided for selectively utilizing any one of the fluid lines to control the brakes.

A further object of this invention is to provide a brake system for tractor-trailer vehicles in which the trailer brakes may be set indefinitely by control means located in the tractor.

Another odject of this invention is to provide automatic means for warning the operator of a vehicle of a reduction in pressure in the fluid pressure brake lines and simultaneously to automatically apply the brakes in the vehicle.

A further object of this invention is to provide manual control means for warning the operator and also for applying the brakes on the vehicle.

A further object of this invention is to provide valve mechanisms of novel design for substituting an auxiliary combination air line for a defective main air line in a vehicle brake system.

A further object of this invention is to provide novel control means for converting an air brake pressure reduction system into a straight air brake system.

Further objects and advantages of the invention will be apparent from the following description taken in conjunction with the drawings, wherein:

Referring now to the drawings in more detail, 10 generally represents the brake controls located in the tractor of a tractor-trailer vehicle and 11 represents the brake controls located in the trailer.

Figure 1:
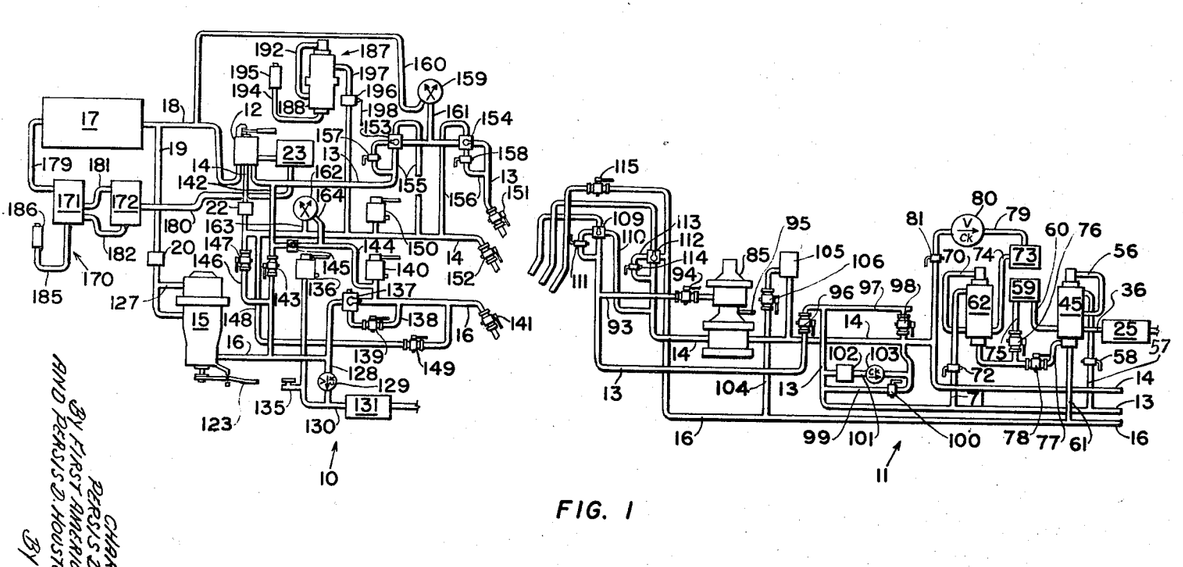
Fig. 1 is a schematic view of the vehicle brake system employed in a tractor and a trailer.

For generally controlling the system in both the tractor and the trailer, a brake valve 12 is located in the tractor for manual control by the operator. Although any type brake valve employed in railroad brake systems may be used, the Westinghouse H-6 brake valve is preferred for the purposes of this invention.

Extending from one port in the brake valve 12 to the rear of the trailer is the main air line 13, and extending from another port in the brake valve 12 to the rear of the trailer is the auxiliary combination line 14.

In the bottom of the tractor at the disposal of the vehicle operator, is a foot-operated straight air brake valve 15. Extending from the straight air brake valve 15 to the rear of the trailer is a straight air brake line 16.

The main reservoir 17 is supplied with fluid under pressure from a compressor, not shown, sufficient to charge the main air line 13 to an operating pressure of 90–120 pounds, but preferably about 110 pounds, through the conduit 18 and the brake valve 12. The main reservoir 17 also supplies compressed air to the straight air brake valve 15 through the conduit 19 and feed valve 20, preferably the Westinghouse C-6 feed valve, adjusted to deliver compressed air to the brake valve 15 at approximately 65 pounds.

Compressed air is supplied to the auxiliary combination line 14 from another port in the brake valve 12, through the feed valve 22, preferably the Westinghouse M-3 feed valve. The feed valve 22 is adjusted to permit a normal operating pressure of 30–65 pounds in the auxiliary combination line 14, when the main air line 13 is fully charged to 110 pounds.

Brake valve 12 is also provided with the conventional equalizing reservoir 23, similar to those employed in railroad brake systems.

Figure 5:
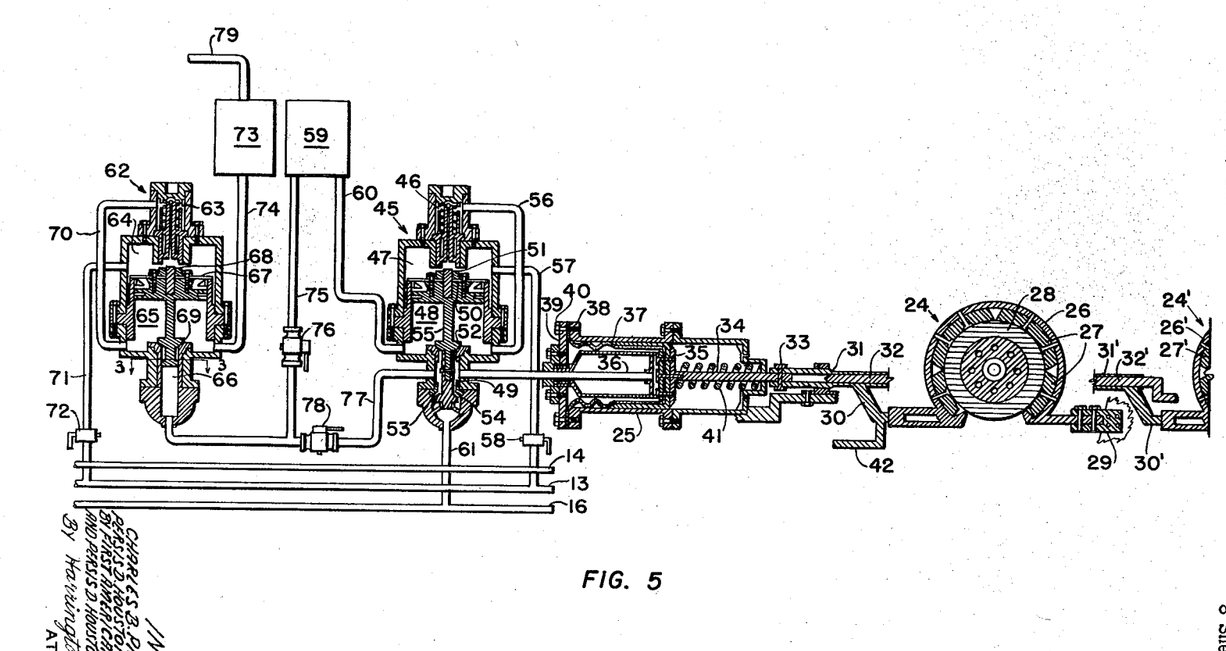
Fig. 5 is a detailed sectional view of the brake operating valves and brake mechanisms operating upon the rear wheels of the trailer.

Referring now to that part of the system in the rear portion of the trailer, disclosed in Figs. 1 and 5, the brake mechanism 24 for the rear wheels of the trailer is operated by a brake cylinder 25. The brake mechanism 24 comprises a circular brake band 26 snugly engaging brake shoes 27 to firmly abut against the hub of the wheel 28. One end of the brake band 26 is fixed at 29 to a portion of the trailer frame. The other end of the brake band 26 comprises an arm 30 fixed to a sleeve 31 adapted to slide on a fixed rod 32. The sleeve 31 is coupled at 33 to the piston rod 34 which is adapted to be moved within the brake cylinder 25 by the piston 35. An air pipe 36 within the brake cylinder 25 permits compressed air to be concentrated against the face of the piston 35 in order to move the piston rod 34 toward the brake mechanism 24, thereby applying the brakes to the rear trailer wheels. Fig. 5 discloses fragments of a second brake mechanism 24' identical with and coupled by means, not shown, to brake mechanism 24. Each brake mechanism controls wheels on separate axles of the trailer and operate in unison.

To prevent leakage of compressed air from the brake cylinder 25, a collapsible boot 37 of cylindrical shape is provided having one end closed as an integral part of the piston 35. The edges of the open end of the boot 37 are tightly held between flanges 38 at one end of the cylinder 25 and the end wall plate 39 of the cylinder by bolts 40. Thus the face of the piston 35 receives the full force of the compressed air from the pipe 36, and there is no seepage of air between the edges of the piston and the walls of the cylinder.

When compressed air is no longer supplied to the cylinder 25 through the air pipe 36, a spring 41 coiled around the piston rod 34 urges the piston 35 away from the brake mechanism 24 to automatically release the brakes.

A connecting link 42 may be attached to the arm 30 for operating brakes on the front wheels of the same vehicle in unison, if desired.

To control the flow of compressed air from the various fluid lines in the system to the brake cylinder 25, a brake operating valve 45 is provided which is somewhat analogous to the conventional triple valve employed in train brake systems. The brake operating valve 45 generally comprises an upper chamber 46, and an upper middle chamber 47, a lower middle chamber 48, and a lower chamber 49. The upper middle and lower middle chambers 47 and 48, respectively, are separated by a flexible diaphragm 50. The upper chamber 46 and the upper middle chamber 47 are separated by a valve 51. The lower middle chamber 48 and the lower chamber 49 are separated by a valve 52. The bottom of the lower chamber 49 is provided with a port 53 which is opened and closed by a valve 54 supported on the valve stem 55, which also supports the valve 52, diaphragm 50 and valve 51. The valves 51, 52 and 54 are moved in unison by the flexible diaphragm 50 in such a manner that when the diaphragm 50 is raised, valves 51 and 54 are closed and valve 52 is open. When the diaphragm 50 is lowered, as disclosed in Fig. 5, valves 51 and 54 are open and valve 52 is closed.

In the brake operating valve 45, the upper chamber 46 communicates with the lower middle chamber 48 through a conduit 56. A fluid condit 57, having an angle cock or cut-out valve 58, is provided to permit the flow of compressed air from the main air line 13 into the upper middle chamber 47. An auxiliary reservoir 59 is provided to supply compressed air through the conduit 60 to the lower middle chamber 48 of the brake operating valve 45. The lower chamber 49 communicates with the brake cylinder 25 through the air pipe 36. The lower chamber 49 also communicates with the straight air brake pipe 16 through the conduit 61.

In order to better control the flow of compressed air through the brake operating valve 45 to the brake cylinder 25, an equalizing valve 62 may be provided of somewhat similar structure to the brake operating valve 45. The equalizing valve 62 is also provided with an upper chamber 63, an upper middle chamber 64, a lower middle chamber 65, and a lower chamber 66. Likewise, a flexible diaphragm 67 separates the upper middle and lower middle chambers 64 and 65, respectively. The upper chamber 63 and the upper middle chamber 64 are separated by a valve 68, while the lower middle chamber 65 and the lower chamber 66 are separated by a valve 69.

The upper chamber 63 of the equalizing valve 62 communicates with the lower middle chamber 65 through a conduit 70. Compressed air from the main air line 13 may also be provided to the upper middle chamber 64 of the equalizing valve 62 through the fluid conduit 71 having a cut-out valve 72. A second auxiliary reservoir 73 communicates with the lower middle chamber 65 through the conduit 74. The lower chamber 66 communicates with the auxiliary reservoir 59 through the fluid conduit 75, having a cut-out valve 76, and with the lower chamber 49 of the brake operating valve 45 through the conduit 77, having a cut-out valve 78. Although the auxiliary reservoir 73 is normally charged through conduit 74, it may also be charged from the auxiliary combination line 14 through a branch conduit 79 provided with a holding check valve 80, and a cut-out valve 81.

Referring now more specifically to Figs. 1, 2, 3 and 4, and that part of the brake system in the forward and middle portions of the trailer, a venting valve 85 is provided having an upper chamber 86, a middle chamber 87 and a lower chamber 88. The middle chamber 87 and the lower chamber 88 are separated by a flexible diaphragm 89, carrying a valve stem 90 which supports a valve 91 adapted to open and close a port 92 between the upper chamber 86 and the middle chamber 87. The main air line 13 communicates with the upper chamber 86 through the branch conduit 93, provided with a cut-out valve 94. The middle chamber 87 is provided with an exhaust port 95. The auxiliary combination line 14 passes through the lower chamber 88 to render the diaphragm 89 responsive to the pressure in line 14.

Figure 4:
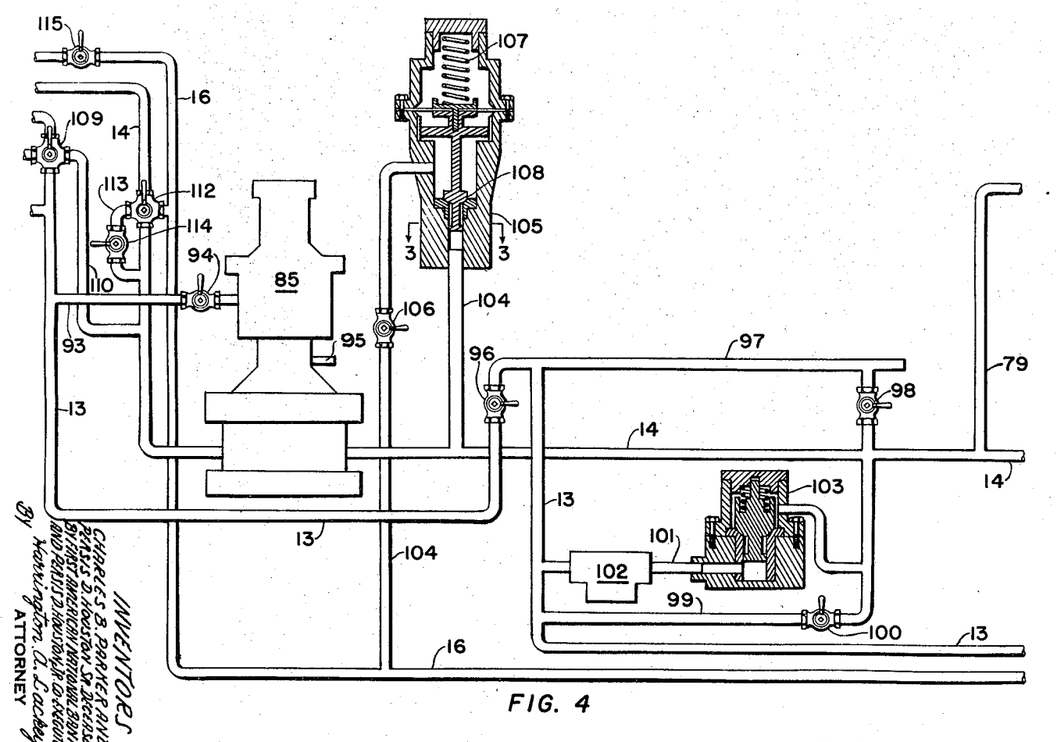
Fig. 4 is a more detailed view of that portion of the brake system located in the forward part of the trailer.

In the middle portion of the trailer, as best disclosed in Fig. 4, the main air line 13 is provided with a cut-out valve 96 which is normally open but may be closed in the event any portion of the main air line 13 forward of the valve 96 becomes defective. The main air line 13 communicates with the auxiliary combination line 14 through branch pipe 97, provided with a cut-out valve 98, or through branch pipe 99, provided with cut-out valve 100. Under normal operating conditions, the cut-out valves 98 and 100 are closed. A third branch pipe 101 is provided with a feed valve 102, preferably a Westinghouse C-6 feed valve, and a holding check valve 103. Thus, when the main air line 13 is under normal operating conditions at 110 pounds pressure, it will feed compressed air through the line 101, feed valve 102, and holding check 103 to charge up the auxiliary combination line 14 to a pressure of 30–65 pounds, depending upon the setting of the feed valve 102.

To provide communication between the auxiliary combination line 14 and the straight air brake line 16, a fluid connecting line 104 containing a venting valve 105 and a cut-out valve 106 is provided. Thus, in the event that the portion of the main air line 13 forward of valve 96 becomes defective, compressed air may be passed from the straight air brake line 16 through line 104, valve 106 and venting valve 105 into the auxiliary combination line 14 to charge the main air line 13 and the auxiliary combination line 14. The venting valve 105 in effect is a check valve permitting the flow of air only from the straight air brake line 16 into the auxiliary combination line 14 when the pressure in the straight air brake line 16 exceeds the tension in the spring 107 to unseat the valve 108. The tension in spring 107 is preferably about 80–90 pounds.

Figure 10:
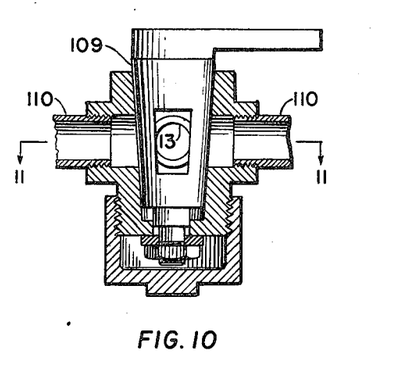
Fig. 10 is a detailed sectional elevational view of a bypass valve.
Figure 11:
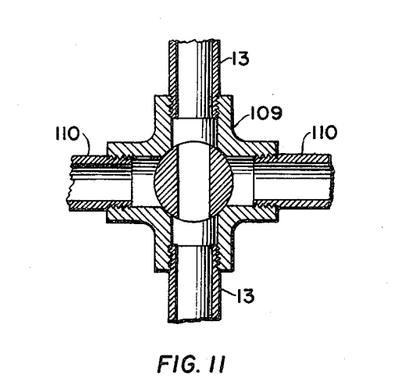
Fig. 11 is a section taken along the lines 11—11 of Fig. 10.

With particular reference to the portion of the system in the forward end of the trailer, an arrangement of bypass valves and cut-out valves are disclosed to open or close any one of the air lines 13, 14 or 16, or to establish inter-communication between the air lines. A by-pass valve 109 of the type disclosed in Figs. 10 and 11, is provided in the main air line 13 of the trailer to permit the passage of air through the line 13 when the valve handle is in the position disclosed in Fig. 10 under normal operating conditions. When the valve 109 is turned to the position disclosed in Figs. 1 and 4, fluid communication is established between the trailer portion of the main air line 13 and the auxiliary combination line 14 through the line 110 provided with an angle cock or cut-out valve 111. In a like manner, a by-pass valve 112 is provided in the auxiliary combination line 14 in the trailer to permit the flow of compressed air from the trailer portion of the auxiliary combination line 14 into the straight air brake line 16 through the inter-communicating line 113, when desired. Line 113 also contains a cut-out valve 114. The cut-out valve 115 is provided in the straight air brake line 16 in the front of the trailer circuit.

With the by-pass valves 109 and 112 in the positions disclosed in Figs. 10 and 11, the flow of air is restricted to the individual lines 13 and 14 in which the respective by-pass valves are located. With the cut-out valve 111 open and the by-pass valve 109 turned to the position disclosed in Figs. 1 and 4, communication is established between the trailer portion of the main air line 13 and the auxiliary combination line 14 through the inter-communicating line 110. With the by-pass valve 109 in the position of Fig. 10 and the by-pass valve 112 in the position of Figs. 1 and 4 and with the cut-out valve 114 open, communication is established between the trailer portion of the auxiliary combination line 14 and the straight air brake line 16 through the inter-communicating line 113. With both by-pass valves 109 and 112 in the positions of Figs. 1 and 4, and the cut-out valves 111 and 114 open, communication is established between the trailer portions of all three of the main air line 13, auxiliary combination line 14 and the straight air brake line 16.

Figure 6:
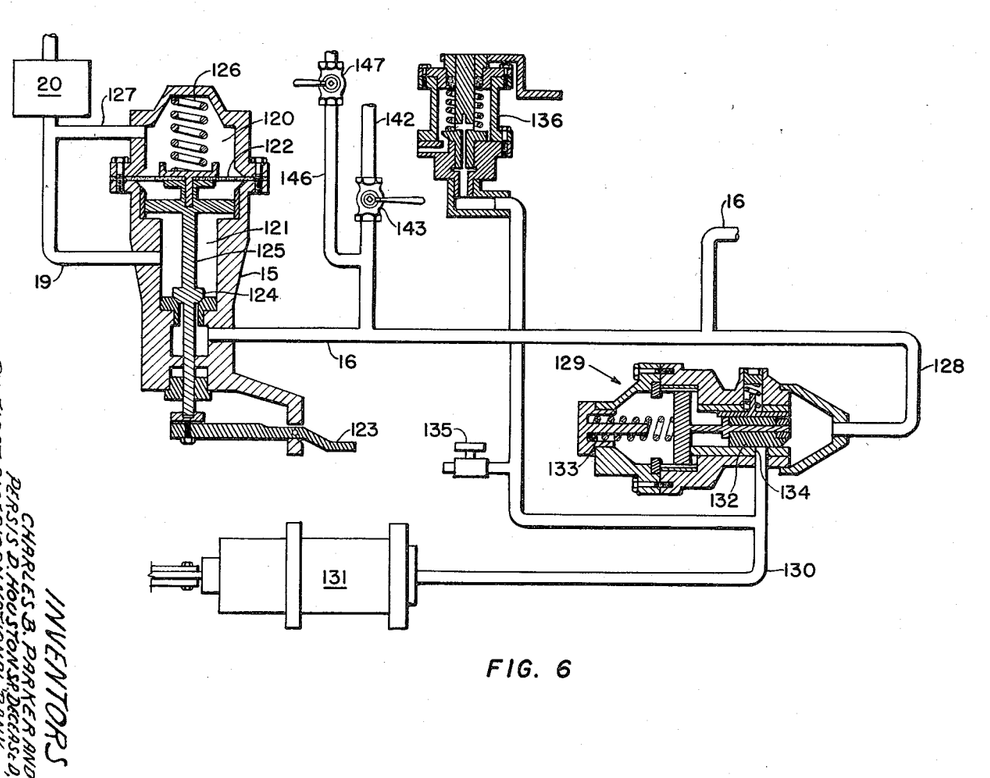
Fig. 6 is a detailed sectional view of the straight air brake operating controls located in the tractor.

Referring now to that portion of the vehicle brake system located in the tractor, and particularly to Fig. 6, the straight air brake valve 15 comprises an equalizing compression chamber 120 and a valve chamber 121 separated by a flexible diaphragm 122. A foot pedal 123 operates the opening and the closing of the valve 124 through a valve stem 125 which is fixed to the diaphragm 122. A coil spring 126 is mounted in the equalizing chamber 120 to urge the diaphragm 122 and valve stem 125 down to close the valve 124 when the pressure on the foot pedal 123 has been released. Compressed air is supplied to the equalizing chamber 120 and the valve chamber 121 through the conduits 127 and 19, respectively. When the valve 124 is opened by application of the foot pedal 123, air passes through the valve chamber 121 into the straight air brake pipe 16, and continues through the tractor and the trailer circuits and into the brake operating valve 45, and the brake cylinder 25 to set the brake mechanisms 24 and 24' in the trailer. At the same time, compressed air will flow into the branch pipe 128 in the tractor circuit, and will then continue through the automatic retaining valve 129, pipe 130 and brake cylinder 131 to set the brake mechanism on the tractor wheels, not shown. Because the air in line 128 must move the sliding valve 132 against the tension of spring 133, which is approximately 20 pounds, to open the port 134, there will be a time lag between the setting of the trailer and the tractor brakes. Setting the trailer brakes first is not only desirable to prevent the trailer from crashing into the tractor, but is also required by Interstate Commerce Commission rules. It will be noted that Figs. 1 and 6 disclose alternate dispositions of the brake cylinder 131 and the valve 129.

The tractor brake mechanism may be released by the exhaustion of compressed air through a foot release valve 135 of any conventional construction or by the manual release and holding valve 136. The valve 136 is of a conventional type, such as that illustrated in Fig. 2 of U.S. Patent No. 1,464,955, and is disclosed with the valve open in release position.

A by-pass exhaust valve 137, similar to valve 109 (Fig. 10), and a by-pass circuit 138 including a cut-out valve 139 are located in the tractor circuit of the straight air brake pipe 16. The normal position of the exhaust valve 137 permits open communication between the tractor and trailer circuits in the straight air brake pipe 16. When the exhaust valve 137 is turned 90 degrees and assumes the position disclosed in Fig. 1, whatever pressure exists in the straight air brake pipe 16 in the tractor forward of the valve 137 will be held, but the pressure in the trailer circuit of the straight air brake pipe 16 behind the valve 137 will be permitted to exhaust to atmosphere through conduit 138 and the exhaust port in valve 137 when the cut-out valve 139 is open. The manual release and holding valve 140 is also provided in the straight air brake pipe 16 behind the exhaust valve 137 in order to release the brake mechanism 24 and 24' in the trailer. The structure of the valve 140 is analogous to the structure of the valve 136. A cut-out valve 141 is provided at the end of the tractor straight air brake pipe 16 to maintain the pressure in the tractor circuit if desired, when the tractor and trailer are uncoupled.

The main air line 13 communicates with the tractor straight air brake circuit 16 forward of the exhaust valve 137 through the pipe 142 having a cut-out valve 143, and with the straight air brake circuit 16 behind the exhaust valve 137 through the branch pipe 144 provided with the cut-out valve 145. In a like manner, the auxiliary combination line 14 communicates with the tractor straight air brake circuit 16 forward of the exhaust valve 137 through the branch pipe 146 having a cut-out valve 147, and communicates with the straight air brake circuit 16 behind the exhaust valve 137 through the branch pipe 148 having a cut-out valve 149. A manual release and holding valve 150, similar to the valves 136 and 140, is provided in the auxiliary combination line 14 in order to release the pressure in line 14 and set the brake mechanism 24 and 24' at any time. Cut-out valve 151 is provided at the rear end of the tractor main air line circuit 13, and cut-out valve 152 is provided at the end of the tractor auxiliary combination line circuit 14, in order to retain the fluid pressure in the tractor when the trailer is uncoupled.

Figure 7:
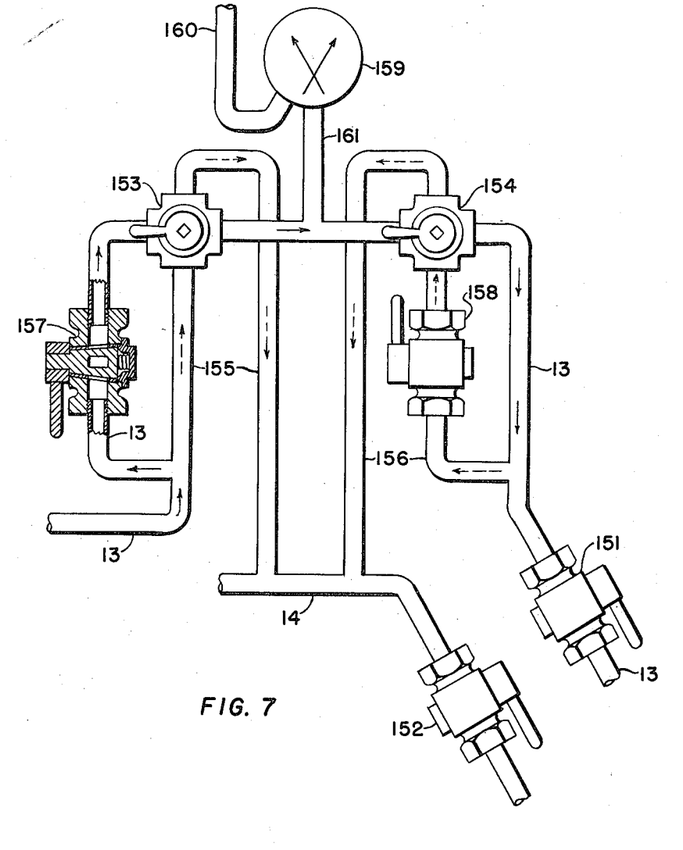
Fig. 7 is a detailed view of the control valves located in the tractor for conversion of the main air line to the auxiliary combination line.

Fig. 7 discloses control means within the tractor for permitting communication between the main air line 13 and the auxiliary combination line 14. A pair of by-pass controlling valves 153 and 154 are provided in the main air line 13, similar to the by-pass valves 109 and 112. A branch pipe 155 connects the auxiliary combination line 14, makes an intersection with the main air line 13 through the control valve 153 and communicates with the tractor portion of the main air line 13. A second branch pipe 156 connects the auxiliary combination line 14, intersects the main air line 13 through the control valve 154 and connects to the trailer portion of the main air line 13. A cut-out valve 157 is provided in the tractor portion of the main air line 13, and another cut-out valve 158 is provided in the branch pipe 156 behind the control valve 154. Under normal operating conditions with the main air line 13 containing a fluid pressure of 110 pounds, the cut-out valve 157 is open and the control valves 153 and 154 are at 90 degrees to the positions disclosed in Fig. 7 to permit the passage of air through the main air line 13 from the tractor to the trailer, as disclosed by the solid-line arrows in Fig. 7. The cut-out valve 158 should remain open in readiness for an emergency.

In the event that any portion of the main air line 13 in the trailer circuit should become defective, valve 153 may be turned to the position disclosed in Fig. 7 to permit compressed air to pass from the tractor main air line circuit 13 through the branch pipe 155 and into the auxiliary combination line 14, as disclosed by the dashed-line arrows in Fig. 7. Thus the trailer circuit of the auxiliary combination line 14 is substituted for the trailer circuit of the main air line 13, and the brake mechanism 24 is still subject to complete control of the operator in the tractor through the brake valve 12.

In the event that the tractor circuit of the main air line 13 becomes defective, the control valve 154 may be turned to the position disclosed in Fig. 7 to permit compressed air from the trailer circuit of the main air line 13 to pass through the branch pipe 156, valve 158, valve 154 and into the auxiliary combination line 14, also disclosed by dashed-line arrows. In such an event, a reduction of pressure in the trailer circuit of the main air line 13 and a simultaneous increase in pressure in the trailer circuit of the auxiliary combination line 14 will open the valve 91 in the venting valve 85 to permit the exhaustion of air in line 13 to atmosphere through the port 95, thereby actuating the brake operating valve 45 to immediately set the brake mechanisms 24 and 24'.

A dual gage 159 is connected through a conduit 160 to the line 13 and through a second conduit 161 to the main air line 13 in order to register the pressures, respectively, in the main reservoir 17 and in the main air line 13. A second dual gage 162 is connected to the auxiliary combination line 14 through the conduit 163 and through a conduit 164 to branch pipe 144, behind the cutout valve 145, in order to register the pressures in the auxiliary combination line 14 and in the straight air brake line 16, respectively.

Figure 8:
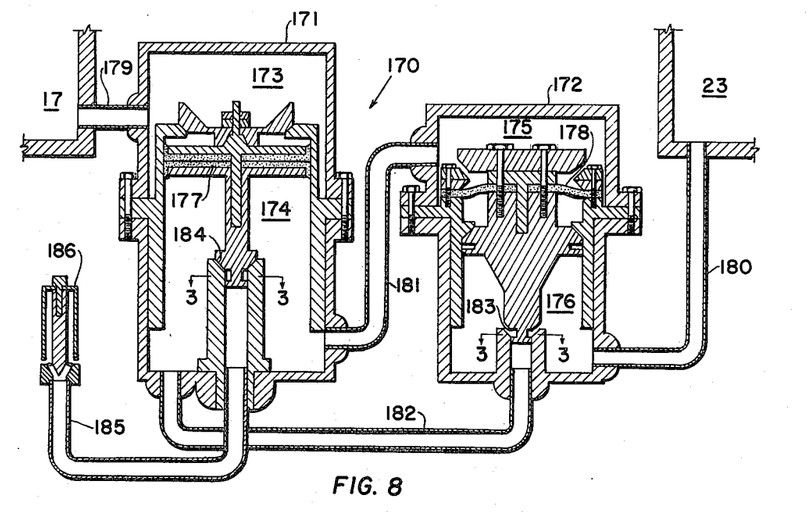
Fig. 8 is a detailed sectional view of the automatic warning system for a reduction in main reservoir pressure.

An additional safety feature generally designated 170, as best disclosed in Figs. 1 and 8, is adapted not only to warn the operator of an accidental loss of pressure in the main reservoir 17, but also to simultaneously and automatically apply the brake mechanisms 24 and 24' in the trailer vehicle. The warning device comprises a pair of self operating automatic valves 171 and 172, each of which comprises an upper and lower chambers 173, 174 and 175, 176, respectively, separated by diaphragms 177 and 178. The upper chamber 173 communicates with the main reservoir 17 through the conduit 179. The lower chamber 176 of the operating, or equalizing valve 172 communicates with the equalizing reservoir 23 through the conduit 180. The lower chamber 174 of the operating valve 171 communicates with the upper chamber 175 of the operating valve 172 through the conduit 181. In addition, the lower chamber 174 communicates with the lower chamber 176 through a conduit 182 opened and closed by a valve 183 supported from the diaphragm 178, in equalizing valve 172. A valve 184 supported by the diaphragm 177 in operating valve 171 controls the flow of compressed air from the lower chamber 174 through the conduit 185 to a warning device, such as whistle 186.

The warning device 170 is preferably set to operate upon a loss in pressure in the main reservoir 17 as slight as three pounds. When the entire brake system is being charged up, compressed air will fill the main reservoir 17 and then pass through the conduit 179 into the upper chamber 173, depressing the diaphragm 177 to close the valve 184, as disclosed in Fig. 8. At the same time the equalizing reservoir 23 is being charged up, and compressed air passes through the conduit 180 into the lower chamber 176 which tends to raise the diaphragm 178 and the valve 183 to the position disclosed in Fig. 8, permitting compressed air to pass through the conduit 182 into the lower chamber 174, conduit 181 and into the upper chamber 175. Thus when the pressure is equalized in the equalizing valve 172 between the chambers 175 and 176, the diaphragm 178 will be depressed causing the valve 183 to close. Under normal operating conditions, the valves 183 and 184 will remain closed at all times.

In the event that the compressor should fail or a leak should develop in the main reservoir 17 which would produce an air loss as slight as three pounds, the same difference in pressure would exist between the upper chamber 173 and the lower chamber 174 causing the valve 184 to become unseated and permit compressed air to pass through the conduit 185 and operate the whistle 186 to warn the operator of the fluid pressure loss in the main reservoir 17. At the same time, a loss in the fluid pressure in the lower chamber 174 caused by the opening of the valve 184 would transmit itself through the conduit 181 to the upper chamber 175 of the operating valve 172 creating a pressure differential between the upper chamber 175 and the lower chamber 176 which would cause the valve 183 to become unseated and create a reduction of fluid pressure in the equalizing reservoir 23. Such a reduction in the equalizing reservoir 23 would transmit itself through the brake valve 12 in a well-known manner and into the main air line 13. Consequently, a reduction in pressure in the main air line 13 would automatically set the brake mechanisms 24 and 24' in the trailer vehicle. Upon being warned by the whistle 186, the operator may assist in applying the brakes by manually turning the brake valve device 12 to either service or emergency positions.

Figure 9:
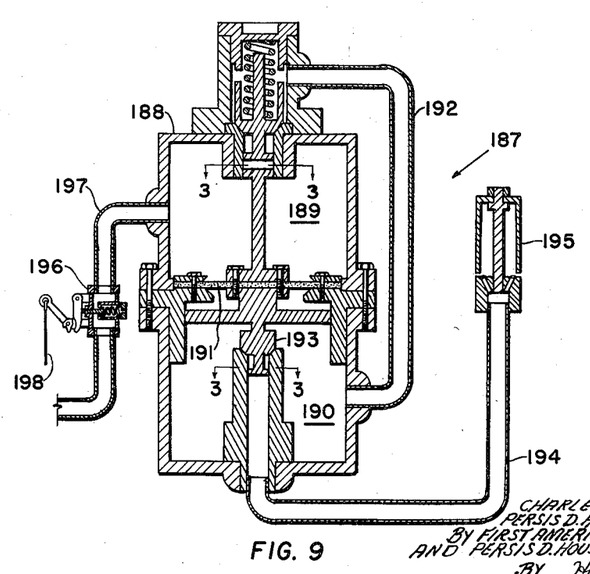
Fig. 9 is a detailed sectional view of a manually controlled warning system.

An additional warning device 187 disclosed in Figs. 1 and 9, may be located in the tractor of a tractor-trailer vehicle or within proximate hearing range of the operator of any type vehicle employing this brake system, and may be adapted to be manually operated by other passengers in remote parts of the vehicle when a defect in the brake system is observed or when it is desired that the vehicle be stopped for any reason. Device 187 comprises a valve mechanism 188 comprising an upper chamber 189 and a lower chamber 190 separated by diaphragm 191. The upper chamber 189 and the lower chamber 190 communicate with each other through a conduit 192. A valve 193 is adapted to be opened and closed by diaphragm 191 to permit the passage of compressed air through the conduit 194 into the whistle 195. An exhaust valve 196 communicates with the upper chamber 189 through the fluid conduit 197 and may be manually operated through the pull cord 198 to simultaneously make a service application of the brake mechanisms 24 and 24' by a reduction of ten pounds in the auxiliary combination line 14 and blow the whistle 195. The cord 198 may be place at the disposal of the vehicle operator and may also be extended to various parts of the vehicle accessible to its passengers. If for any reason a passenger wishes to signal the operator of the vehicle to stop, cord 198 is pulled to open the exhaust valve 196 and reduce the pressure in the upper chamber 189. A pressure differential between the chambers 189 and 190 causes the diaphragm 191 to raise and unseat the valve 193 to permit the passage of compressed fluid through the conduit 194 to the whistle 195.

The operation of the entire vehicle brake system will now be described:

Assuming the system is under normal "running" condition, with the brake mechanisms in all the vehicles released, the main reservoir 17 will be charged with compressed air sufficient to maintain a running pressure of 110 pounds in the main air line 13 from the brake valve 12 in the tractor to the end of the line 13 in the last trailer vehicle. It will also be assumed that the feed valves 22 and 102 are set to supply compressed air at 65 pounds pressure to the auxiliary combination line 14 when the main line 13 is fully charged. Furthermore, under running conditions, the straight air brake valve 15 will be closed so that atmospheric pressure will appear in the straight air brake line 16 from the brake valve 15 to the end of the last vehicle. Feed valve 20 will be set to supply air to the brake valve 15 at 65 pounds pressure.

Under running conditions in the main air line 13 with the tractor and trailer circuits coupled, by-pass control valves 153 and 154 are open to permit the passage of air through main air line 13, and cutout valves 157, 158 and 151 are open. By-pass valve 109 is open to permit passage of air through line 13, and cutout valve 111 is open. Valves 94 and 96 are open, but valves 98 and 100 are closed. Valves 72, 58 and 76 are open, but valve 78 is normally closed.

Under running conditions, in the auxiliary combination line 14, the manual release valve 150 is normally closed. Cutout valve 152 is open, by-pass valve 112 is open to permit the passage of air through the line 14, and cutout valve 114 is normally open, and cutout valve 81 is normally open.

Under running conditions, in the straight air brake line 16, the exhaust valve 137 is normally closed to the atmosphere to permit the passage of air through line 16, and the cutout valves 139, 141, 115 and 106 are normally open.

In the tractor circuits, the intercommunicating cutout valves 143, 145, 147 and 149 are normally closed. The foot release valve 135 and the manual release valves 136 and 140 are normally closed.

Also as previously described, all the valves in the warning systems 170 and 187 are normally closed.

Also under running conditions, the air pressure in chambers 46, 47 and 48 in the brake operating valve 45 are equalized at 110 pounds to close the valve 52. And the pressure in chambers 63, 64 and 65 of the equalizing valve 62 are equalized at 110 pounds pressure to close the valve 69. The auxiliary reservoirs 59 and 73 are also maintained at 110 pounds pressure.

Figure 2:
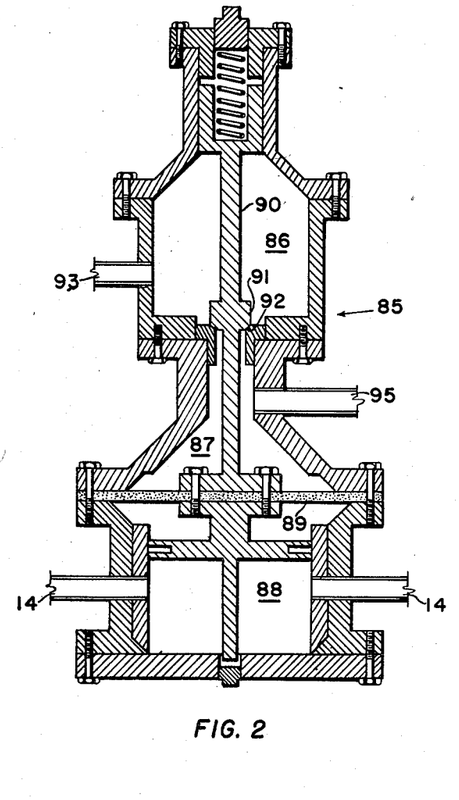
Fig. 2 is a detailed sectional view of the automatic venting valve.
Figure 3:
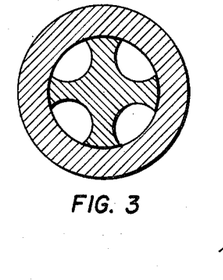
Fig. 3 is a section taken along the lines 3—3 of Figs. 4, 5, 8 and 9.

The pressure in chamber 86 of the venting valve 85 is normally at 110 pounds pressure, and the pressure in the lower chamber 88 is equal to the pressure in the auxiliary combination line 14, normally 65 pounds. The spring-biased valve stem 90 is set to open the valve 92, when the pressure in lower chamber 88 is increased, preferably to 70 pounds. Middle chamber 87 is at atmospheric pressure.

If it is desired to apply the brake mechanisms 24 and 24' in the trailer, the operator makes a service application by turning the brake valve 12 to make a reduction in the main air line 13 of about 10 pounds. This reduction in pressure is transmitted through the tractor and trailer circuit 13, and through the conduit 57 to the upper middle chamber 47 in the brake operating valve 45. The excessive pressure in chamber 48 raises the diaphragm 50 to open the valve 52 to permit compressed air to flow from the auxiliary reservoir 59 through the chamber 48, valve 52, chamber 49 and into the brake pipe 36, thrusting the piston 35 in the brake cylinder 25 toward the brake mechanism 24. This motion is transmitted through the piston rod 34, sleeve 31, and arm 30 to tighten the brake band 26 against the brake shoes 27 and wheel hub 28.

Simultaneously, the reduction of pressure in main air line 13 is transmitted through the conduit 71 to the upper middle chamber 64 of the equalizing valve 62, which causes the valve 69 to open to permit the flow of compressed air from the auxiliary reservoir 73 through the conduit 74, chamber 65, valve 69, chamber 66, valve 76, and conduit 75 to charge the reservoir 59. Should the pressure in the reservoir 73 be reduced below 65 lbs., a check valve 80 will open to permit the flow of compressed air at 65 pounds from the auxiliary combination line 14 into the reservoir 73 through the conduit 79.

In the event of mechanical failure of the brake operating valve 45, the equalizing valve 62 may be converted into a brake operating valve by opening a cutout valve 78 in the line 77 to effect direct communication between the chamber 66 of the equalizing valve 62 through the chamber 49 of the operating valve 45 into the brake pipe 36.

For heavy-duty braking, the equalizing valve 62 is employed with the operating valve 45. However, for light-duty braking on unloaded trailers, for example, the equalizing valve 62 may be cut out of the system by closing valves 72, 76 and 78, leaving only the operating valve 45 in the system.

It will be readily seen from the above description, that if the main air line 13 in either the trailer or the tractor circuit should burst at any point, the rapid reduction in pressure would automatically set the brake mechanisms 24 and 24'.

If a stoppage, including a turned cutout or by-pass valve, should occur at any point in the main air line 13, either in the tractor or the trailer circuit, the brake mechanisms 24 and 24' could still be set by operating the brake valve 15 to supply air of at least 15 pounds pressure through the straight air brake line 16, conduit 61, port 53 and chamber 49 of the brake operating valve 45, to charge the brake cylinder 25 through the pipe 36.

The auxiliary combination line 14 may be completely converted into an automatic brake application line and fully substituted for the main air line 13 by closing valve 94 to cut off the venting valve 85, closing valve 96 in the main air line 13, closing valve 81 to cut out auxiliary reservoir 73, opening either or both valves 98 and 100 to establish communication between the auxiliary combination line 14 and the main air line 13, and turning by-pass valve 153 to the position disclosed in Figs. 1 and 7 to introduce air from the main air line 13 into the auxiliary combination line 14. Thus, by operating the brake valve 12 in the same manner as it is operated for controlling the brake mechanisms through main air line 13, identical response of the brake mechanisms will be obtained through auxiliary combination line 14.

Assuming that the main air line 13 in the trailer circuit between conduits 71 and 99 should become clogged in such a manner that the brake operating valves 45 and 62 would not respond to the controls of the operator and a reduction in the main air line 13 would not be transmitted to the brake operating valve 45, the brake mechanisms 24 and 24' could still be applied through the straight air brake line 16, as described above. Ordinarily a stoppage in the main air line 13 between the conduits 71 and 99 will cause a reduction in pressure to the rear of the stoppage because of normal leakage in the brake operating valve parts. In such event, brake mechanisms 24 and 24' may also be applied by opening either or both of the valves 98 and 100 to charge the auxiliary combination line 14 from the main air line 13, causing compressed air at 110 pounds pressure to pass through the check valve 80, conduit 79, auxiliary reservoir 73 and conduit 74 to open the equalizing valve 62 and brake operating valve 45, and charge the brake cylinder 25 to apply the brake mechanisms 24 and 24'. Also the same operation may be effected by keeping the valves 98 and 100 closed and by turning the by-pass control valve 153 in the tractor so that compressed air at 110 pounds pressure will pass from the main air line 13 through the conduit 155 into the auxiliary combination line 14. If the leakage is fast enough, the reduction of pressure will automatically set the brakes.

Assuming there is a stoppage in the main air line 13 of the trailer circuit between the by-pass valve 109 and the cutout valve 96, the cutout valve 96 may then be closed, and either or both the cutout valves 98 and 100 be opened to permit a reduction of pressure in the main air line 13 behind the valve 96, thereby applying the trailer brakes. The brakes may also be set by diverting compressed air from main air line 13 into auxiliary combination line 14 by turning valve 153 to charge auxiliary reservoir 73 through check valve 80, as previously described.

In the event of a stoppage including an accidentally turned cutout valve in the main air line 13 any where in the tractor circuit, by-pass valve 109 may be turned to the position disclosed in Fig. 1 to permit a simultaneous reduction of pressure in the trailer main air circuit 13 and an increase of pressure in the auxiliary combination line 14 to produce the combined effect of reducing the pressure in the upper middle chambers 64 and 47 of the operating valves 62 and 45, respectively, and increasing the pressure in the lower middle chambers 65 and 48, respectively, to open the valves 69 and 52 and permit the passage of compressed air into the brake cylinder 25.

This combination effect also reduces the main air line pressure in the upper chamber 86 of the venting valve 85 and increases the auxiliary combination line pressure in the lower chamber 88 to open the valve 91 and hasten the reduction of pressure in the main air line 13 by permitting the flow of air from the main air line through conduit 93, chamber 86, valve 91, chamber 87 and exhaust port 95.

Additional or sustained braking power may be obtained when the tractor circuit of the main air line 13 is clogged, by turning by-pass valve 109 to open circuit 110 until the pressures in trailer circuit 13 and 14 are equalized, then close valve 111, and turn by-pass valve 112 to open circuit 113. The auxiliary combination line 14 in the trailer circuit may then be freely charged from the straight air brake line 16 to apply the trailer brakes.

If a stoppage occurs in the main air line 13 forward of the by-pass control valve 154, then the valve 154 may be turned to the position disclosed in Fig. 1 or Fig. 7 to permit compressed air in the trailer circuit of the main air line 13 to pass through the conduit 156, cutout valve 158, by-pass control valve 154 and into the auxiliary combination line 14.

An application of the brake mechanisms 24 and 24' may be made if a stoppage in the main air line 13 occurs at any point behind the intersection of line 13 with intercommunicating conduit 142, by opening the cutout valve 143 or the cutout valve 145 and supplying compressed air from the brake valve 12 through conduit 142 directly into the straight air brake line 16, or through conduit 144 into line 16.

It is also possible to control the brake mechanisms 24 and 24' by operation of the brake valve 12 directly through the auxiliary combination line 14. By turning the brake valve handle to emergency position, a reduction of pressure is effected throughout the line 14. When this pressure reduction is transmitted to the branch line 101 in the trailer, the feed valve 102 and check valve 103 will open causing a reduction in the main air line 13 in order to restore the normal pressure of 65 pounds in the auxiliary combination line 14. The pressure reduction (10 pounds) in the main air line is sufficient to activate the brake operating valve 45 to set the brake mechanisms 24 and 24'. The brake mechanisms 24 and 24' may also be set in the same manner by opening the manual release valve 150 in the tractor.

As previously described, it is also possible to set the brake mechanisms 24 and 24' by increasing the pressure in the auxiliary combination line 14, when there is little or no pressure in the auxiliary reservoirs 59 and 73, and the air will flow through the check valve 80, conduit 79 and charge reservoir 73 to set the brakes.

Also, as previously described in connection with the warning device 187, the brake mechanisms 24 and 24' may be set by pulling the cord 198 to open the valve 196, thereby reducing the pressure in line 14 and simultaneously blowing the whistle 195.

In setting the brake mechanisms 24 and 24' in the trailer by operation of the pedal-controlled straight air brake valve 15, as previously described, the tractor brake mechanism, not shown, is applied slightly later and in the same manner as the trailer brake mechanisms 24 and 24'.

Either by preference, or if the brake valve 15 should fail for any reason, the cutout valve 143 may be opened and compressed air from the main air line 13 may be supplied directly to the straight air brake line 16 through line 142. By leaving valve 143 open, the brakes in both the tractor and trailer may be held indefinitely so long as the compressor continues to operate.

Cutout valve 145 may be used alternately with valve 143 for applying the brakes in both the trailer and tractor. Valve 145 may also be employed if there is a defect in line 16 forward of exhaust valve 137.

If it is desired to set only the trailer brake mechanisms 24 and 24', and not the tractor brakes, valve 137 may be turned to exhaust position, disclosed in Fig. 1, closing line 16 and opening conduit 138 to atmosphere. Valve 139 is then closed, and valve 145 opened to charge brake cylinder 25 from main air line 13 through straight air brake line 16. Since no air can pass valve 137, brake cylinder 131 will not be charged and the tractor brakes will remain released.

With the valve 137 in exhaust position and valve 139 open, the trailer brakes will remain released, and only the tractor brakes may be applied, either through brake valve 15, or the opening of cutout valve 143 or 147.

Cutout valve 147 is provided to supply air from the auxiliary line 14 through conduit 146 into the straight air brake line 16 in the same manner as cutout valve 143 is used to supply air from line 13.

Cutout valve 149 is also provided to supply air from the auxiliary combination line 14 through conduit 148 into the straight air brake line 16 in the same manner as cutout valve 145 is used to supply air from line 13.

Both the foot release valve 135 and the manual release valve 136 are designed for the reduction of pressure in the brake cylinder 131 to release the tractor brakes only.

Manual release valve 140 is employed for reducing the pressure in straight air brake line 16 to release the brake mechanisms 24 and 24' in the trailer only, regardless of the positions of the valves 137 and 139. The exhaust valve 137 may perform the same function when the cutout valve 139 is open.

In the event of stoppages, including turned cutout or by-pass valves in the tractor circuits or forward portions of the trailer circuits 13 and 14, or defects in the rear portion of the trailer straight air brake pipe 16, compressed air may be supplied from the straight air brake pipe 16, through conduit 104 in the trailer, cutout valve 106, and into venting valve 105 to overcome the spring 107, unseat the valve 108, and charge auxiliary combination line 14. The air in line 14 may then either pass through check valve 80 to actuate the brake operating valves 62 and 45, or the air in line 14 may charge the lower chamber 88 of venting valve 85 to vent air from main air line 13 through exhaust 95 to set the brake mechanisms 24 and 24'.

If there should be a stoppage or leak of any kind throughout the length of the straight air brake pipe 16, the brake mechanisms may be controlled through the main air line 13 or the auxiliary combination line 14.

It will also be understood that if any one or any two of the three air lines are defective, the remaining line may be exercised to fully control the application and release of the brake mechanisms.

In the event that the warning device 170 should fail, the operator of the vehicle may detect a loss of compression in the main reservoir 17 by reading the gage 159. By observing the gage 162, the operator can also quickly detect any defects in the auxiliary combination line 14 including defective feed valves 22 and 102. The gage 162 also registers the pressure in the straight air brake line 16 behind exhaust valve 137 and in the trailer brake cylinder 25 to indicate to the operator whether the trailer brakes are applied or released.

If any one of the three air lines 13, 14 or 16 should be accidentally coupled with any one of the other lines, operation of the controls under running conditions will automatically set the trailer brake mechanisms 24 and 24'. Should the main tractor air line 13 be miscoupled with the trailer auxiliary line 14 or the trailer straight air brake line 16, the running main air line pressure of 110 pounds will increase the pressures in either of the trailer circuits to automatically set the brake mechanisms 24 and 24', as previously described. Miscoupling of the tractor auxiliary combination line 14 to either the trailer lines 13 or 16, will cause a reduction in the main line 13 or an increase of pressure in the line 16 to automatically set the brake mechanisms 24 and 24'. Miscoupling of the tractor straight air brake line 16 to either the trailer lines 13 or 14 will cause a reduction of pressure to apply the trailer brakes.

It is to be understood that this brake system may be employed on any number of trailers, and moreover is not restricted to tractor-trailer vehicles, but may be used on railroad trains, buses and other type vehicles. It is also within the concept of this invention to employ the system with types of fluid-operated brakes other than the type disclosed in Fig. 5.

The automatic and manual controls and safety features of this system will considerably reduce the hazards of vehicle movement and particularly the increasing highway traffic of trucks and tractor-trailer vehicles.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. A fluid brake system for a vehicle comprising a main fluid line normally charged to a predetermined pressure, an auxiliary combination fluid line normally charged to a predetermined pressure less than said main line pressure, and a straight fluid brake line normally carrying atmospheric pressure, a brake mechanism adapted to be actuated by fluid pressure of a predetermined value substantially less than said auxiliary combination line pressure, an auxiliary reservoir communicating with and adapted to be charged with compressed fluid from said auxiliary combination line, a brake operating valve assembly comprising a first valve communicating said brake mechanism with said auxiliary reservoir, a second valve for communicating said brake mechanism with said straight fluid brake line, and means responsive to the pressure in said main line for controlling said first and second valves, said pressure responsive means being adapted to close said first valve and open said second valve under normal operating pressures, said pressure responsive means being adapted to open said first valve to supply compressed fluid from said auxiliary reservoir to said brake mechanism and to close said second valve when a reduction of pressure is effected in said main line.

2. The invention according to claim 1 in which a check valve is provided to permit passage of fluid from said auxiliary combination line into said auxiliary reservoir when the pressure in said auxiliary combination line exceeds the pressure in said auxiliary reservoir.

3. The invention according to claim 2 in which a valve is provided to communicate the main fluid line with said auxiliary combination fluid line, said valve being adapted to be opened to permit the passage of fluid between said main line and said auxiliary combination line and to be closed to prevent the passage of fluid between said main line and said auxiliary line.

4. The invention according to claim 1 in which a venting valve communicates with said main fluid line and said auxiliary combination line, means operative within said venting valve for automatically venting fluid in said main line to atmosphere thereby reducing the pressure in said main line when the pressure in said auxiliary combination line is increased above normal.

5. The invention according to claim 4 in which check valve means communicates said straight fluid brake line with said auxiliary combination line to permit passage of fluid from said straight fluid brake line into said auxiliary combination line when the pressure in said straight fluid brake line exceeds a predetermined value greater than the auxiliary combination line pressure.

6. The invention according to claim 1 in which a line having a feed valve and a check valve in series communicates said main fluid line with said auxiliary combination line, the value of said feed valve being such as to permit the passage of fluid from said main line into said auxiliary combination line only when the pressure in said auxiliary combination line is less than normal.

7. An air brake system for a tractor and for a trailer coupled to said tractor comprising a main air line normally charged to a predetermined pressure, an auxiliary combination air line normally charged to a predetermined pressure less than said main line pressure, and a straight air brake line normally carrying atmospheric pressure, brake mechanisms for the tractor and the trailer, each mechanism comprising a brake cylinder adapted to be actuated by compressed air of a predetermined value substantially less than said auxiliary combination line pressure, an auxiliary reservoir for the trailer communicating with said auxiliary combination line, a brake operating valve communicating the trailer brake cylinder with said main line, said auxiliary reservoir and said straight air brake line, means operative within said operating valve to maintain open communication between said trailer brake cylinder and said straight air brake line and closed communication between said trailer brake cylinder and said main line and said auxiliary reservoir under normal operating pressure, said means being operative to close communication between said trailer brake cylinder and said straight air brake line and to open communication between said auxiliary reservoir and said trailer brake cylinder when a reduction of pressure is effected in said main air line or when the pressure in said auxiliary combination line exceeds the pressure in said main air line, a check valve to permit said auxiliary line to supply compressed air to said auxiliary reservoir when the auxiliary line pressure exceeds the reservoir pressure, a feed valve for the trailer to supply compressed air from said main line into said auxiliary combination line only when the auxiliary line pressure is below normal, a first brake valve for the tractor for controlling the air pressures in said main line and said auxiliary line, said tractor brake cylinder communicating with said straight air brake line, and a second brake valve for controlling the air pressure in said straight air brake line.

8. The invention according to claim 7 in which a plurality of by-pass valves are provided at intervals in said main air line throughout said tractor and said trailer, each by-pass valve communicating with said auxiliary combination line, each by-pass valve being operative in open position to maintain open communication through said main air line and closed communication from said main air line through said by-pass valve to said auxiliary line and in closed position to close communication through said main air line and to open communication between a portion of the main air line on one side of said by-pass valve and said auxiliary combination line.

9. The invention according to claim 7 in which an angle-cock is adapted to be located in the tractor to communicate the main air line with the straight air brake line and in which a second angle-cock is provided to communicate the auxiliary combination line with said straight air brake line.

10. The invention according to claim 7 in which a by-pass valve is located in said straight air brake line between said tractor brake cylinder and said trailer brake cylinder, said by-pass valve being operative to maintain open communication through said straight air brake line when said valve is open and to exhaust the portion of the straight air brake line communicating with said trailer brake cylinder when said by-pass valve is closed.

11. The invention according to claim 10 in which said main air line communicates with said straight air brake line on both sides of said by-pass valve and in which the auxiliary combination line communicates with the straight air brake line on opposite sides of said by-pass valve in said straight air brake line, and angle-cocks for opening and closing communication between said lines on both sides of said by-pass valve.

12. The invention according to claim 7 in which a venting valve is adapted to be located in the trailer and communicates with said main air line and said auxiliary combination line, means operative within said venting valve for exhausting air from said main line to reduce the main line pressure when the normal pressure in said auxiliary combination line is exceeded.

13. The invention according to claim 12 in which a check valve is adapted to be located in the trailer through which compressed air is supplied from said straight air brake line into said auxiliary combination line when the pressure in said straight air brake line exceeds a predetermined value greater than said auxiliary combination line pressure.

14. The invention according to claim 7 in which a first by-pass valve is adapted to be located in said main air line near the front portion of said trailer and communicates with said auxiliary combination line, said first by-pass valve maintaining open communication through said main air line and closed communication with said auxiliary combination line when said first by-pass valve is open, said first by-pass valve closing communication with the portion of the main air line forward of said valve and opening communication between the portion of the main air line behind said valve with the auxiliary combination line when said valve is closed, a second by-pass valve adapted to be located in the auxiliary combination line near the front portion of said trailer and communicating with the straight air brake line, said valve maintaining open communication in said auxiliary combination line and closed communication with said straight air brake line when said valve is open, said second by-pass valve maintaining closed communication with the portion of the auxiliary combination line forward of said valve and maintaining open communication between the portion of the auxiliary combination line behind said valve with said straight air brake line when said valve is closed.

15. The invention according to claim 7 in which first and second controlling by-pass valves are adapted to be located in the tractor portion of the main air line, each of said controlling valves being adapted to communicate with the tractor portion of said auxiliary combination line, said controlling valves maintaining open communication through said main air line and closed communication with said auxiliary combination line when said valves are open, said first controlling valve closing communication to the portion of the main air line to the rear of said valve and maintaining open communication between the portion of the main air line forward of said valve with said auxiliary combination line when said first valve is closed, said second controlling valve closing communication with said main air line forward of said second valve and opening communication between the portion of the main air line to the rear of said valve with said auxiliary combination line when said second valve is closed.

16. The invention according to claim 7 in which the normal predetermined pressure of said main air line is approximately 90–120 pounds, the normal pressure of said auxiliary combination line is 30–65 pounds and the pressure necessary to actuate said brake cylinder is at least 15 pounds.

17. A fluid brake system for a vehicle comprising a main fluid line normally charged to a predetermined pressure, an auxiliary combination fluid line normally charged to a predetermined pressure less than said main line pressure, and a straight fluid brake line normally carrying atmospheric pressure, a brake mechanism adapted to be actuated by fluid pressure of a predetermined value substantially less than said auxiliary combination line pressure, an auxiliary reservoir communicating with said auxiliary combination line, a brake operating valve comprising an upper and lower chamber separated by a pressure-responsive diaphragm, a first valve controlled by said diaphragm for supplying compressed air from said lower chamber to said brake cylinder, said auxiliary reservoir communicating with said lower chamber, a second valve controlled by said diaphragm for controlling the supply of compressed air from said straight air brake line to said brake cylinder, a third valve controlled by said diaphragm for communicating said upper and lower chambers, means for communicating said main air line with said upper chamber, means for controlling the pressure in said main air line and said auxiliary combination line, and means for controlling the pressure in said straight air brake line, said first valve being closed and said second and third valves being open when the pressure in said upper chamber is equal to or greater than the pressure in said lower chamber under charging or normal operating pressures, said first valve being open and said second and third valves being closed upon the upward movement of said diaphragm when the pressure in said lower chamber exceeds the pressure in said upper chamber to permit compressed air to pass from said auxiliary reservoir through said lower chamber into said brake cylinder to apply said brake mechanism.

18. The invention according to claim 7 in which said first brake valve communicates with a main reservoir and also an equalizing reservoir, a device for warning the operator of said tractor of a loss in main reservoir pressure and for simultaneously making a reduction in said main air line, said warning device comprising an operating valve mechanism and an equalizing valve mechanism, said operating valve mechanism having an upper and lower chamber separated by a pressure-responsive diaphragm, and said equalizing valve mechanism comprising an upper and lower chamber separated by a pressure-responsive diaphragm, said upper chamber of said operating valve mechanism communicating with said main air reservoir and said lower chamber of said equalizing valve mechanism communicating with said equalizing reservoir, the air pressures in said main reservoir and equalizing reservoir being normally equal, means for communicating the lower chamber of said operating valve mechanism with the upper chamber of said equalizing valve mechanism, first valve means actuated by the diaphragm in said equalizing valve mechanism communicating the lower chambers of said operating valve mechanism and said equalizing valve mechanism, said first valve means being open to permit the free passage of compressed air from said equalizing reservoir to the lower chambers of both valve mechanisms and the upper chamber of the equalizing valve mechanism, said first valve means being closed by the action of said diaphragm when all said chambers are maintained at equal pressure, a whistle communicating with the lower chamber of said operating valve mechanism, and second valve means controlled by the diaphragm in said operating valve mechanism to actuate said whistle when the pressure in the main reservoir and the upper chamber of said operating valve mechanism is reduced a predetermined value below the normal equalizing pressure.

References Cited in the file of this patent
UNITED STATES PATENTS

| | | |
|---|---|---|
| 2,187,966 | Donovan | Jan. 23, 1940 |
| 2,302,486 | Aikman | Nov. 17, 1942 |